(12) United States Patent
Wang

(10) Patent No.: US 7,948,753 B2
(45) Date of Patent: May 24, 2011

(54) PORTABLE ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 89 days.

(21) Appl. No.: 12/548,628

(22) Filed: Aug. 27, 2009

(65) Prior Publication Data

US 2010/0177467 A1 Jul. 15, 2010

(30) Foreign Application Priority Data

Jan. 14, 2009 (CN) .......................... 2009 1 0300180

(51) Int. Cl.
*G06F 1/16* (2006.01)
(52) U.S. Cl. .................... 361/679.59; 220/318; 248/455
(58) Field of Classification Search ............. 361/679.59; 220/318, 756; 248/917, 455
See application file for complete search history.

(56) References Cited

U.S. PATENT DOCUMENTS

| | | | | | |
|---|---|---|---|---|---|
| 4,951,241 | A | * | 8/1990 | Hosoi et al. | 361/679.09 |
| 5,235,495 | A | * | 8/1993 | Blair et al. | 361/679.26 |
| 5,293,300 | A | * | 3/1994 | Leung | 361/679.59 |
| 5,351,508 | A | * | 10/1994 | Kelley | 70/58 |
| 5,375,076 | A | * | 12/1994 | Goodrich et al. | 361/679.17 |
| 5,642,258 | A | * | 6/1997 | Barrus et al. | 361/679.59 |
| 5,721,668 | A | * | 2/1998 | Barrus et al. | 361/679.59 |
| 7,206,198 | B2 | * | 4/2007 | Wang | 361/679.55 |
| 7,342,778 | B2 | * | 3/2008 | Fan et al. | 361/679.55 |
| 7,492,581 | B2 | * | 2/2009 | Kuo | 361/679.55 |
| 7,576,981 | B2 | * | 8/2009 | Kuo | 361/679.59 |
| 7,612,998 | B2 | * | 11/2009 | Fan et al. | 361/679.59 |
| 2010/0165553 | A1 | * | 7/2010 | Wang | 361/679.01 |

* cited by examiner

*Primary Examiner* — Lisa Lea-Edmonds
(74) *Attorney, Agent, or Firm* — Clifford O. Chi

(57) ABSTRACT

A portable electronic device includes a main body and a handle. The main body defines two receiving cavities therein. An anti-rotation groove is defined in a sidewall of each receiving cavity. The handle includes a holding portion and two support portions extending from opposite ends of the holding portion. A latch protrusion is formed on each support portion. The latch protrusions are substantially cylindrical and two flat resisting surfaces are formed on each latch protrusion. Each latch protrusion is movably received in one corresponding receiving cavity and able to slide from the corresponding receiving cavity into the corresponding anti-rotation groove so that the resisting surfaces of the latch protrusions resist sidewalls of the anti-rotation grooves, such that the handle supports the main body.

12 Claims, 8 Drawing Sheets

PORTABLE ELECTRONIC DEVICE

BACKGROUND

1. Technical Field

The present invention relates to a portable electronic device.

2. Description of the Related Art

Generally, a notebook computer includes a main body, a display panel, a hinge assembly connecting the main body to the display panel, and a carrying handle. The carrying handle includes a rod portion and two rotation portions formed on opposite ends of the rod portion. The main body defines two elongated slots to receive the rotation portions of the carrying handle. The rotation portions of the carrying handle are received in the slots of the main body.

When the rotation portions of the carrying handle are at a first end of the slots, the carrying handle can support the main body. When the rotation portions of the carrying handle are at a second end of the slots opposite to the first end of the main body, the carrying handle may be grasped and the notebook computer easily carried.

However, impact is easily generated on the notebook computer by the rotation portions of the carrying handle freely sliding along the elongated slots of the main body.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
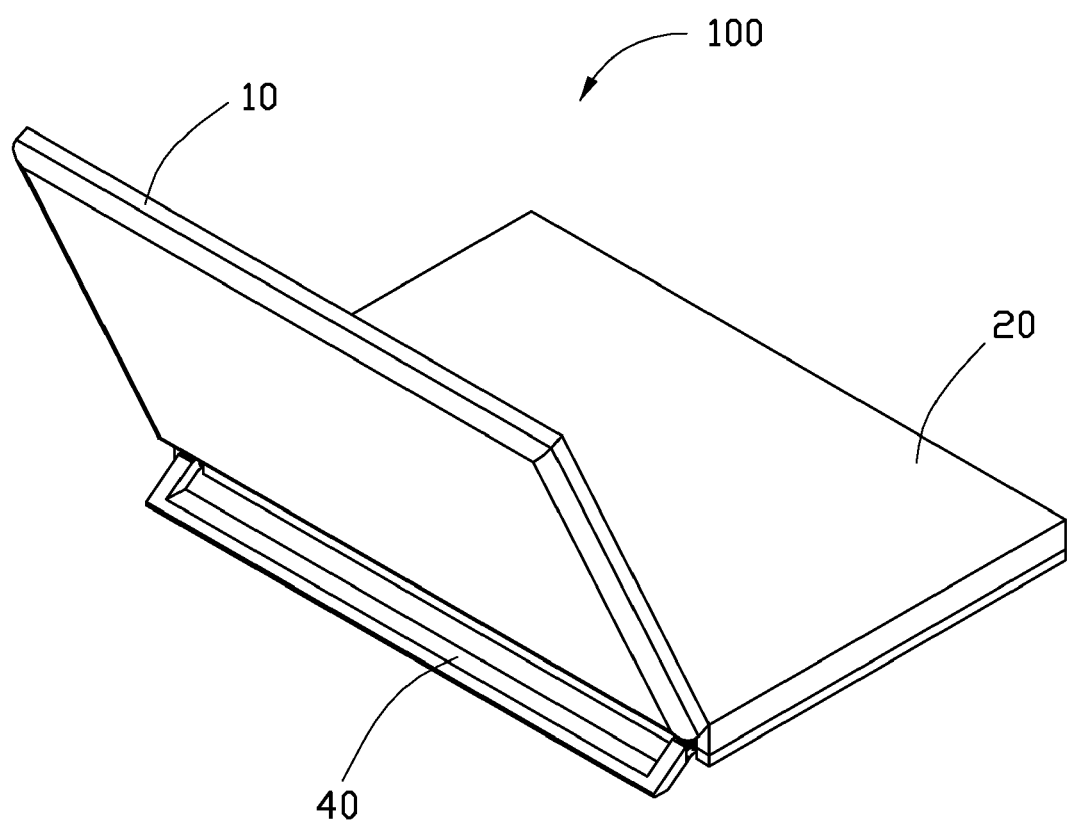
FIG. 1 is an isometric view of one embodiment of a portable electronic device in an operational state.
Figure 2:
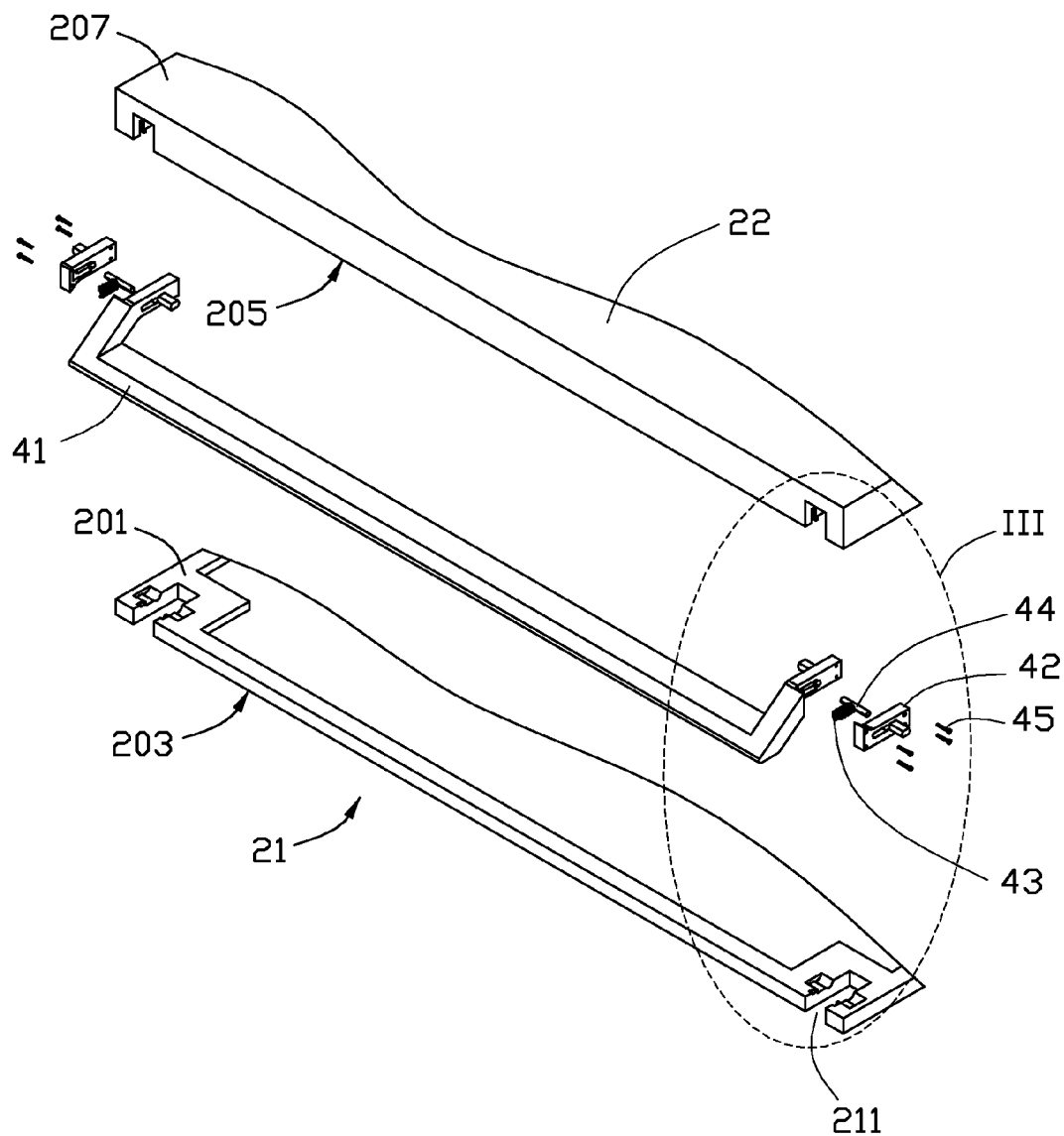
FIG. 2 is a partial, exploded isometric view of the portable electronic device in FIG. 1.
Figure 3:
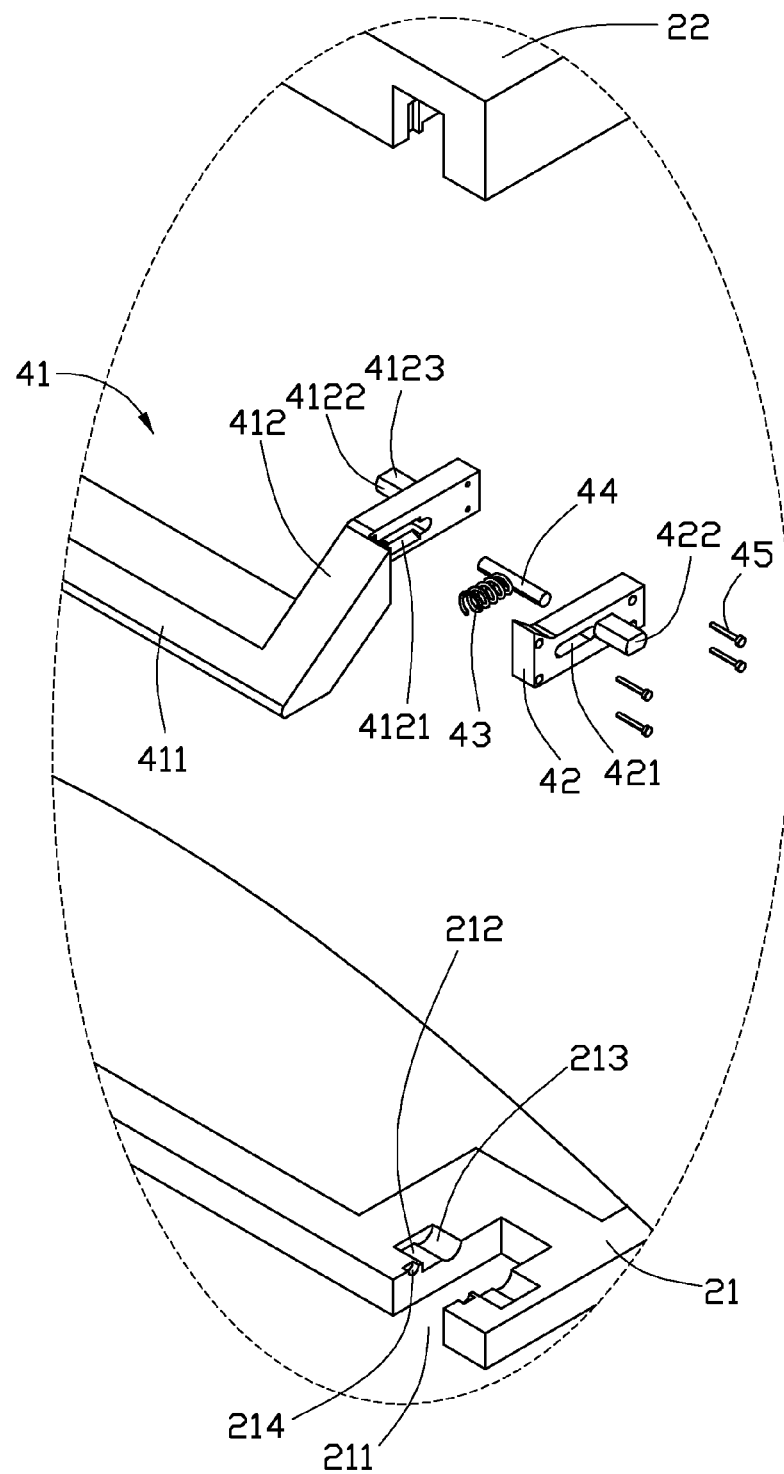
FIG. 3 is an enlarged view of a circled portion III in FIG. 2.
Figure 4:
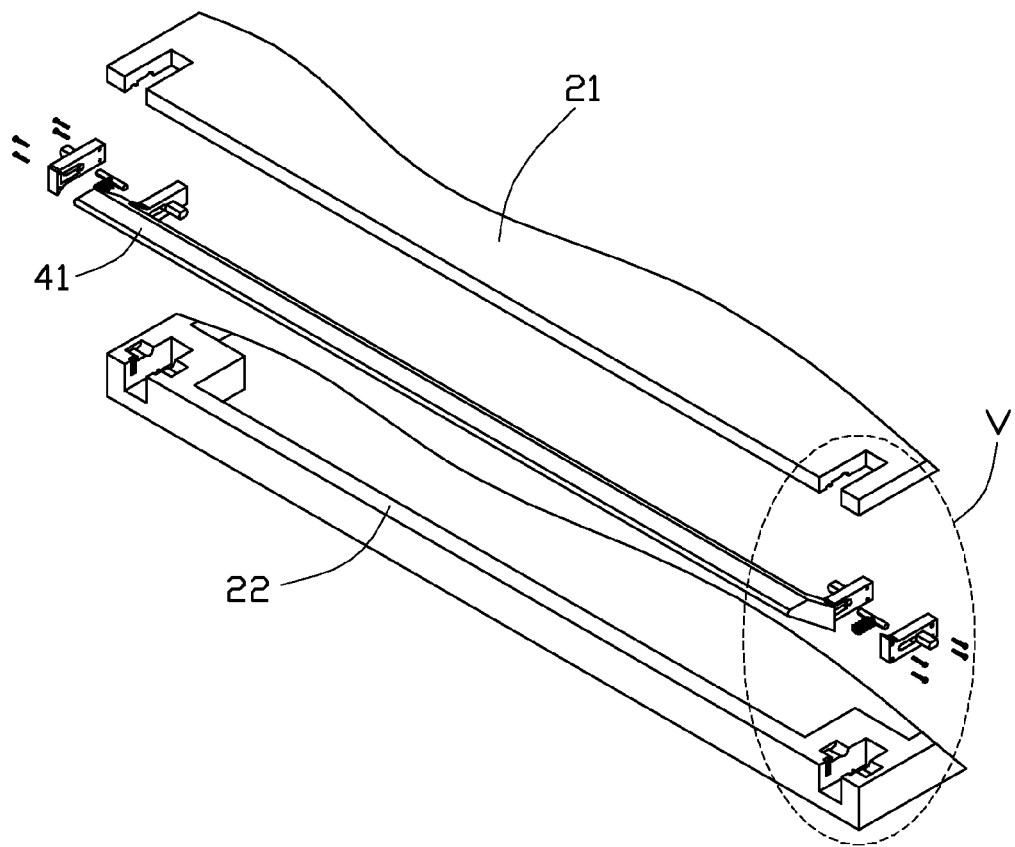
FIG. 4 is similar to FIG. 2, but shown from another aspect.
Figure 5:
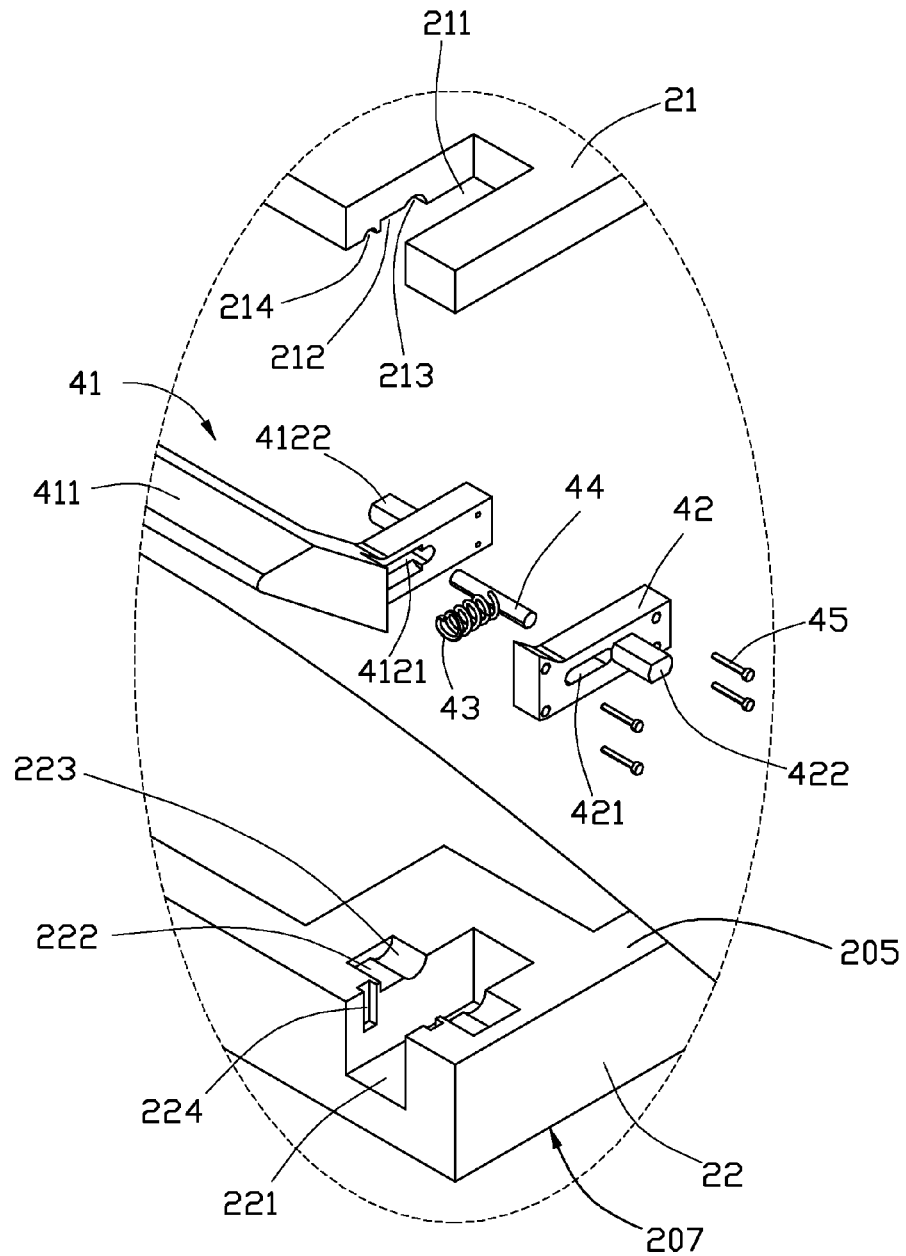
FIG. 5 is an enlarged view of a circled portion V in FIG. 4.

Referring to FIG. 1, one embodiment of a portable electronic device 100 includes a display panel 10, a main body 20, and a handle assembly 40 positioned on the main body 20.

Referring to FIGS. 2 through 5, the main body 20 includes a first base plate 21 and a second base plate 22 positioned on the first base plate 21.

The first base plate 21 includes a first surface 201 and a second surface 203 opposite to the first surface 201. Two cutouts 211, two rectangular grooves 212, two curved grooves 213, and two receiving depressions 214 are defined in the first surface 201 of the first base plate 21.

The cutouts 211 connect the first surface 201 to the second surface 203. The rectangular grooves 212 and the curved grooves 213 are connected and arranged side by side. The cutouts 211 intersect the rectangular grooves 212 and the curved grooves 213.

The second base plate 22 is similar to the first base plate 21. Two cutouts 221, two rectangular grooves 222, two curved grooves 223, and two receiving depressions 224 are defined in a first surface 205 of the second base plate 22. However, the cutouts 221 do not connect the first surface 205 to a second surface 207 of the second base plate 22.

The handle assembly 40 includes a handle 41, two engaging members 42, two elastic members 43, and two fixing members 44.

The handle 41 may be substantially U-shaped and includes an elongated holding portion 411 and two support portions 412 extending from opposite ends of the holding portion 411.

Each support portion 412 defines a through hole 4121 and forms a latch protrusion 4122 in an inner side of the support portion 412 adjacent to the through hole 4121. The latch protrusion 4122 is substantially cylindrical and has two substantially parallel flat resisting surfaces 4123. Additionally, the latch protrusion 4122 substantially extends along a longitudinal axis of the holding portion 411.

Each engaging member 42 may be substantially rectangular and defines an elongated through hole 421 corresponding to one through hole 4121 of the handle 41. A latch protrusion 422 is formed on a side of each engaging member 42. A shape and size of each latch protrusion 422 of the engaging member 42 correspond to a shape and size of each latch protrusion 4122 of the support portion 412 of the handle 41.

Figure 6:
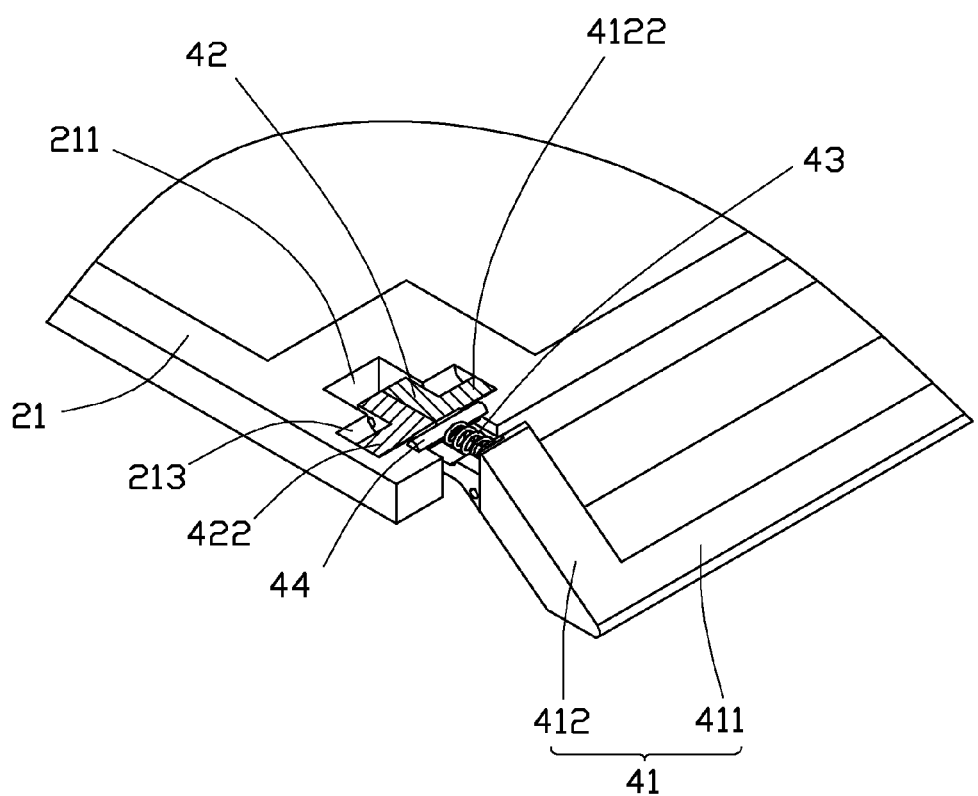
FIG. 6 is a partially enlarged view of the portable electronic device in FIG. 1.

Also referring to FIG. 6, during assembly, one engaging member 42 is fixed to one support portion 412 of the handle 41 by fasteners 45. The other engaging member 42 is fixed to another support portion 412 of the handle 41 by similar means.

The latch protrusions 422 and 4122 may substantially align with a common axis. An extending axis of the latch protrusions 422 of the engaging member 42 is opposite to that of the latch protrusions 4122 of the support portion 412 of the handle 41. The engaging members 42 may be integrally formed with the handle 41.

The elastic members 43 are received in the through hole 4121. One fixing member 44 passes through the through hole 4121 of one engaging member 42 and the through hole 421 of one corresponding holding portion 411. Another fixing member 44 passes through the through hole 4121 of another engaging member 42 and the through hole 421 of another corresponding holding portion 411. A first end of each elastic member 43 resists one fixing member 44 and a second end of each elastic member 43 resists the sidewall of the corresponding through hole 4121 of the handle 41.

The support portions 412 of the handle 41 are received in the cutouts 221 of the first base plate 22 such that the protrusions 4122 of the handle 41 and the latch protrusions 422 of the engaging members 42 are received in the curved grooves 213 of the first base plate 21.

The second base plate 22 is positioned on the first base plate 21. The cutouts 211 of the first base plate 21 and the cutouts 221 of the second base plate 22 define two cavities (not labeled). The rectangular grooves 212 of the first base plate 21 and the rectangular grooves 222 of the second base plate 22 define two anti-rotation grooves (not labeled), with an anti-rotation groove defined in a sidewall of each receiving cavity. The curved grooves 213 of the first base plate 21 and the curved grooves 223 of the second base plate 22 define two receiving cavities (not labeled). The receiving depressions 214 of the first base plate 21 and the receiving depressions 224 of the second base plate 22 define two elongated sliding grooves (not labeled).

Furthermore, the receiving cavities are substantially cylindrical. The receiving cavities and the anti-rotation grooves are connected and arranged side by side. The distance between the resisting surfaces 4123 is less than the depth of the anti-rotation grooves.

The latch protrusions 422, 4122 latch in the anti-rotation grooves such that the resisting surfaces 4123 of the latch protrusions 4122 of the support portion 412 resist the sidewalls of the anti-rotation grooves and prevent the handle 41 from rotating. In this state, the handle 41 and the main body 20 define an angle, thus the handle 41 supports the main body 20.

Figure 7:
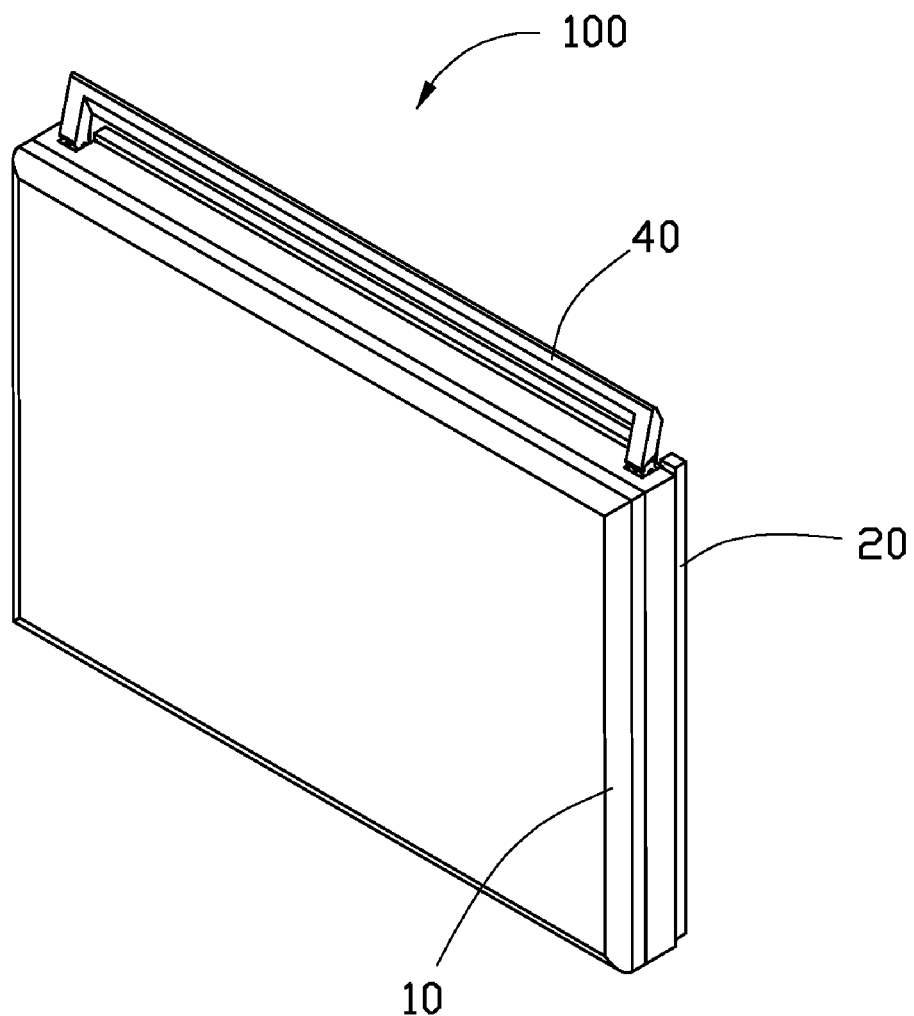
FIG. 7 is an isometric view of the portable electronic device in a portable state.
Figure 8:
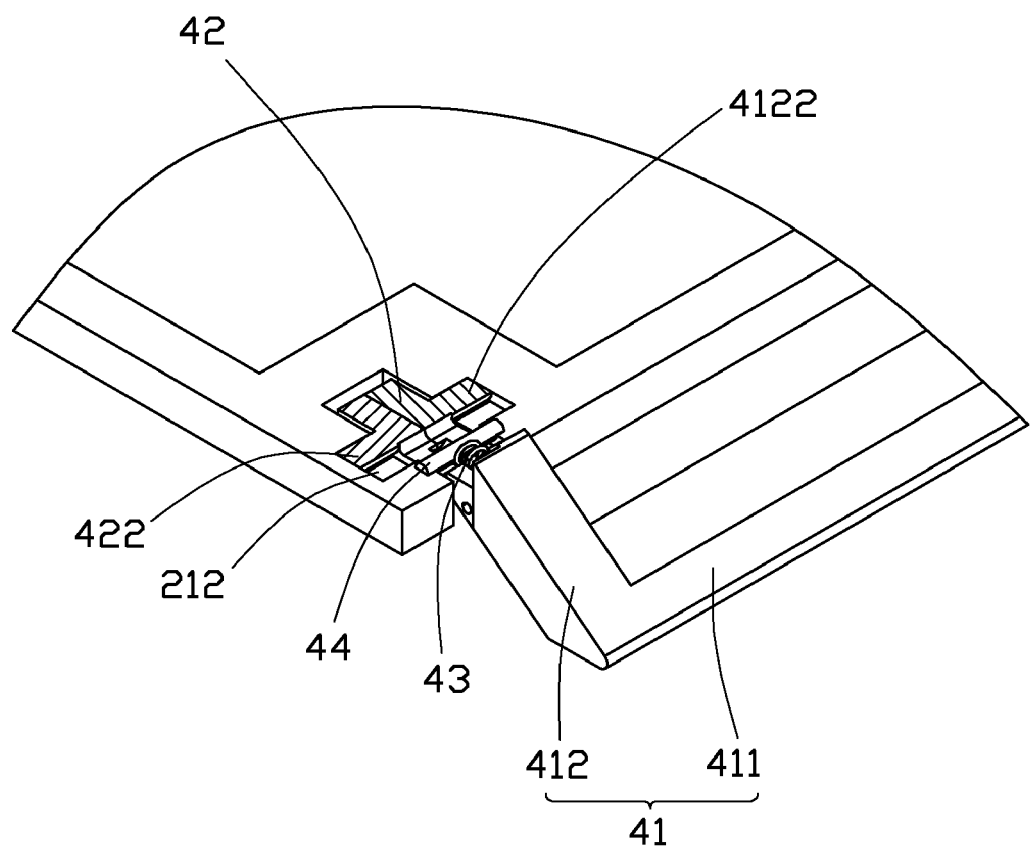
FIG. 8 is a partially enlarged view of the portable electronic device in FIG. 7.

Also referring to FIGS. 7 and 8, an external force applied to the handle 41 impels support portions 412 of the handle 41 to compress the elastic members 43 and the latch protrusions 422 such that the latch protrusions 4122 move into the receiving cavities.

When the handle 41 is rotated and the fixing members 44 slide along the sliding grooves, the latch protrusions 422, 4122 latch in the receiving cavities and prevent the support portions 412 from detaching from the receiving grooves. In this state, the handle 41 is rotatable, allowing convenient transport of the portable electronic device 100 as shown in FIGS. 7 and 8.

It should be understood that the elastic members 43 and the fixing members 44 may be omitted.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. A portable electronic device comprising:
a main body defining two receiving cavities therein, and an anti-rotation groove defined in a sidewall of each receiving cavity; and
a handle comprising a holding portion and two support portions extending from opposite ends of the holding portion, wherein a latch protrusion is formed on each of the support portions; the latch protrusions are substantially cylindrical; two flat resisting surfaces are formed on each latch protrusion; each latch protrusion is movably received in one corresponding receiving cavity and able to slide from the corresponding receiving cavity into the corresponding anti-rotation groove such that the resisting surfaces of the latch protrusions resist sidewalls of the anti-rotation grooves, whereby the handle supports the main body.

2. The portable electronic device of claim 1, wherein the receiving cavities are substantially cylindrical.

3. The portable electronic device of claim 1, wherein the two resisting surfaces are substantially parallel to each other and the anti-rotation grooves are substantially rectangular.

4. The portable electronic device of claim 1, wherein the main body defines two receiving grooves intersecting the anti-rotation grooves and the receiving cavities; an end of each support portion is received in the corresponding receiving groove of the main body.

5. The portable electronic device of claim 4, wherein the main body comprises a first base plate and a second base plate positioned on the first base plate, each base plate comprising a first surface and a second surface opposite thereto; the first base plate defines two cutouts through the first and second surfaces thereof, the second base plate defines two cutouts in the first surface thereof that do not extend through to the second surface of the second base plate; the cutouts of the first base plate and the cutouts of the second base plate define the two receiving grooves.

6. The portable electronic device of claim 5, wherein each of the first base plate and the second base plate defines two curved grooves in the first surface thereof; the curved grooves of the first base plate and the curved grooves of the second base plate define the two receiving cavities.

7. The portable electronic device of claim 6, wherein each of the first base plate and the second base plate defines two rectangular grooves in the first surface thereof, the rectangular grooves of the first base plate and the rectangular grooves of the second base plate define the two anti-rotation grooves.

8. The portable electronic device of claim 7, wherein the rectangular grooves of the first base plate and the curved grooves of the first base plate are connected and arranged side by side.

9. The portable electronic device of claim 8, wherein the cutouts of the first base plate intersect the rectangular grooves of the first base plate and the curved grooves of the first base plate.

10. The portable electronic device of claim 9, further comprising two fixing members and two engaging members fixed to the support portions of the handle, wherein the main body defines two elongated sliding grooves adjacent and substantially perpendicular to the anti-rotation grooves; each support portion defines a through hole; each engaging member defines a through hole; and the fixing members pass through the through holes of the support portions and the through holes of the engaging members to latch in the sliding grooves of the main body.

11. The portable electronic device of claim 10, further comprising two elastic members received in the through holes of the support portions of the handle such that a first end of each elastic member resists one fixing member, and a second end of each elastic member resists the sidewall of the corresponding through hole of the support portions of the handle.

12. The portable electronic device of claim 11, wherein each of the first base plate and the second base plate defines two receiving depressions; the receiving depressions of the first base plate and the receiving depressions of the second base plate defining the two sliding grooves.

* * * * *